UNITED STATES PATENT OFFICE.

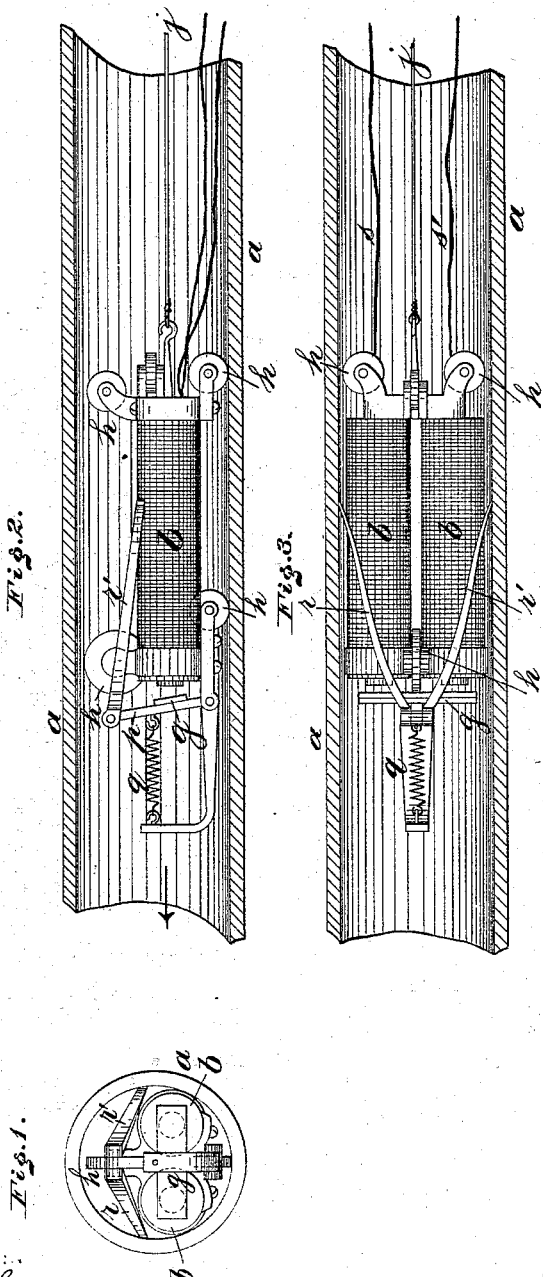

WILLIAM J. PHILIPS AND GEORGE L. KITSON, OF PHILADELPHIA, PENNSYLVANIA, ASSIGNORS TO SAID PHILIPS.

MOTOR FOR DRAWING WIRES THROUGH TUBES.

SPECIFICATION forming part of Letters Patent No. 274,818, dated March 27, 1883.

Application filed July 29, 1882. (No model.)

*To all whom it may concern:*

Be it known that we, WILLIAM J. PHILIPS and GEORGE L. KITSON, both citizens of the United States, residing in Philadelphia, Pennsylvania, have invented a new and useful Improvement in Motors for Drawing Wires Through Tubes, of which invention the following is a specification.

This invention relates to the devices used for getting wires for electrical purposes into and through tubes or other protecting-conduits.

It consists of an electro-magnet provided with anti-friction wheels and an armature with prongs which engage the sides of the tube or conduit, and which, by preventing the movement of the armature toward the magnet, cause the magnet to move up to the armature each time the electric circuit is closed, and thus advance the magnet and any light thread or wire attached to it through the tube or conduit.

In the annexed drawings, Figure 1 is a front end elevation; Fig. 2, a section of the tube or conduit, showing inside the same, in side elevation, the traveling electro-magnet and its appurtenances. Fig. 3 is a section of the tube or conduit and a plan of the traveling electro-magnet and its appurtenances.

Similar letters represent similar parts in the several views.

$a$ represents the tube or conduit; $b$, the magnet, which is provided with wheels $h$. The armature $g$ is attached to a pivoted post, $p$, which is provided with a spring, $q$, to draw the armature away from the magnet when the current of electricity is broken, and it is also provided with elastic prongs $r\ r'$, the points of which are kept in contact with the interior surface of the tube or conduit $a$, as shown.

$s$ and $s'$ are the opposite ends of the wire connecting the magnet with a battery. (Not shown.) When the electric circuit through the wire $s\ s'$ is closed the armature $g$ is prevented from moving toward the magnet by the prongs $r$ and $r'$, and the magnet being free to move advances forward to the armature, and this movement occurs each time the circuit is closed. The magnet, being thus moved forward in the direction of the arrow, draws after it the light thread or wire $j$.

We claim—

The electro-magnet $b$, provided with anti-friction wheels, as described, and the armature $g$, provided with a spring, $q$, and elastic prongs $r\ r'$, and means for attaching a line or wire to said magnet, the whole constituting a motor for drawing through tubes or conduits a light thread or wire, in the manner and for the purpose substantially as set forth.

WILLIAM J. PHILIPS.
GEORGE L. KITSON.

Witnesses:
J. E. SHAW,
JOHN A. WIEDERSHEIM.